(12) United States Patent
Gupta et al.

(10) Patent No.: US 8,255,288 B1
(45) Date of Patent: Aug. 28, 2012

(54) HIGH DEMAND SALE PROCESSING

(75) Inventors: Diwakar Gupta, Seattle, WA (US); Paul C. Schattauer, Seattle, WA (US); Chih-Jen Huang, Kirkland, WA (US); Philip Yuen, Bellevue, WA (US); Ammar Chinoy, Seattle, WA (US); Kiran Kumar Meduri, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 608 days.

(21) Appl. No.: 12/364,677

(22) Filed: Feb. 3, 2009

(51) Int. Cl.
*G06Q 30/00* (2012.01)

(52) U.S. Cl. ........... 705/26.41; 705/26.1; 705/27.1

(58) Field of Classification Search ......... 705/26, 705/27, 26.1, 26.41, 27.1
See application file for complete search history.

(56) References Cited

U.S. PATENT DOCUMENTS

| 8,036,929 | B1* | 10/2011 | Reisman | 705/7.29 |
| 2002/0052797 | A1* | 5/2002 | Maritzen et al. | 705/26 |
| 2002/0184102 | A1* | 12/2002 | Markopoulos et al. | 705/26 |
| 2003/0093306 | A1* | 5/2003 | Onoyama | 705/5 |
| 2005/0010494 | A1* | 1/2005 | Mourad et al. | 705/26 |
| 2005/0071245 | A1* | 3/2005 | Norins et al. | 705/26 |
| 2005/0177785 | A1* | 8/2005 | Shrader et al. | 715/513 |
| 2008/0017706 | A1* | 1/2008 | Malik | 235/383 |
| 2008/0270251 | A1* | 10/2008 | Coelho et al. | 705/26 |

OTHER PUBLICATIONS

Arnoldy, Ben, "High-tech scalpers hit World Series," The Christian Science Monitor, Oct. 26, 2007 p. 3. [retrieved on Aug. 4, 2009].*
"Software 'robots' expected to flood auction sites," Milwaukee Journal Sentinel, Milwaukee, Wis.: Aug. 22, 2000. [retrieved on Jan. 20, 2010].*
"In Bots We Trust?," by Saul Hansell, New York Times (Late Edition (East Coast)), New York, N.Y., Nov. 18, 1999, p. G1.*
U.S. Appl. No. 11/546,534 entitled "Transaction Authorization Service", filed Oct. 10, 2006.
U.S. Appl. No. 11/858,006, filed Sep. 19, 2007, "Method and Apparatus for Authorizing Transactions Using Transaction Phrases in a Transaction Authorization Service".

* cited by examiner

*Primary Examiner* — Jeffrey A Smith
*Assistant Examiner* — Anne Georgalas
(74) *Attorney, Agent, or Firm* — Lee & Hayes, PLLC

(57) ABSTRACT

Item scarcity resulting from a high demand of the item is addressed by providing users a high demand sale process. In some aspects, users may opt-in to purchase the item in a sale by transmitting a mobile message to a host over a mobile device network prior to a sale of the item. If the user is eligible, the host then attempts to purchase the item on behalf of the user once the sale begins.

18 Claims, 7 Drawing Sheets

HIGH DEMAND SALE PROCESSING

BACKGROUND

Periodically, a highly anticipated item is made available for sale by a merchant who incurs rapid inventory depletion due to high consumer demand of the item. Parents seem to deal with this reoccurring event each holiday season when the item is the latest child's toy that is often out-of-stock at retailers due to inventory depletion. Although fast selling items benefit merchants, these situations also present many challenges. One common problem is managing customer satisfaction. When a customer has a negative experience with a merchant, the customer may discontinue business with that merchant, or sometimes even worse, discourage others from continuing business with the merchant.

Customer satisfaction may be lowered when available items are purchased by another party that intends to exploit the item's popularity and offer the item for resale at a higher price. For example, a reseller may try to purchase many items before other consumers have an opportunity to purchase the item, thus quickly depleting the item's inventory, and thus the ability for others to obtain the item. Although many merchants try to limit the quantity of items per transaction, such limits are often easy to circumvent.

Prior to electronic commerce (e-commerce), people would sometimes spend hours or even days standing in line waiting for a chance to purchase an item, such as a ticket to see a world famous music performer. However, in the widely used e-commerce environment, no equivalent to standing in line exists. Consequentially, limiting quantities of items sold to each customer becomes even more challenging in the e-commerce environment than in traditional environments, such as a brick and mortar environment. One difficulty in e-commerce is the use of Internet robots (bots) that resellers sometimes create to automatically purchase popular items. Some resellers may employ bots that search for items made available on a network and then have the bots make multiple purchases of these items on behalf of the reseller. Often, these bots are sophisticated and capable of creating user accounts for each item purchased, thus circumventing (or spoofing) conventional quantity limitation restrictions used by the merchants.

Sometimes merchants offer a pre-order for popular or highly anticipated items, which enables a customer to order an item prior to the date that the item is released. Pre-orders do not limit resellers from participating in the process. Thus, resellers may preorder large quantities of the items, often using bots that disguise the identity of the reseller.

Other merchants may present captchas, a type of challenge-response test that may include an image of letters and/or numbers to users. The letters and numbers may be distorted or otherwise obscured such that a computer process (e.g., bot) has difficulty translating the letters and numbers, but are relatively easy for a human to discern. Such a captcha requests that the customer correctly translate the image to a typed input prior to accepting a transaction request for processing. However, these additional processes create extra work for legitimate customers. They may also be circumvented by using human intervention when a bot reaches the image translation point in the sale, thus making it still fairly easy to circumvent the quantity restriction.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, merchants often have difficulty distributing items during a high demand sale because, among other reasons, resellers purchase available items in large quantities and then resell those items to customers, often at a price higher than the merchant sale price. By providing customers with a more fair and convenient purchasing process and limiting sales to resellers, a merchant may advantageously improve customer goodwill.

Mobile messaging enables customers to conduct transactions using text-based messaging over mobile networks. U.S. patent application Ser. No. 11/858,006 entitled, "Method and Apparatus for Authorizing Transactions Using Transaction Phrases in a Transaction Authorization Service," filed on Sep. 19, 2007, discloses a system for mobile text-based messaging from user accounts associated with a mobile telephone number. According to some embodiments of the present disclosure, a mobile device such as a mobile telephone, is used to conduct the transaction. One potential advantage of mobile messaging includes an ability to limit each telephone number to a single account. Although users can create multiple customer accounts with the merchant with relative ease, most users (and resellers) have limited access to a significant number of additional mobile telephone numbers. Acquisition of additional mobile telephone numbers is often cost prohibitive. Thus, a merchant may be more likely to enforce a quantity limit of an item in a high demand sale by having a purchaser conduct a transaction using a mobile telephone messaging system as discussed herein. Although some embodiments are described as being implemented by interacting with a customer's mobile telephone, other embodiments may use any of a number of other computing devices (e.g., cable set-top boxes, e-book readers, personal computers, etc.).

In various embodiments, the high demand sale process may purchase items for customers that opt-in to the sale. Items may be purchased on behalf of the customers by employing one or more host robots (bots), which may process transactions automatically at a predetermined rate to minimize disrupting an order system used to process transactions of the items. For example, each of the host bots can be throttled to reduce the rate of ordering a specified threshold (e.g., one order per second, one order per minute, etc.).

Illustrative System

Figure 1:
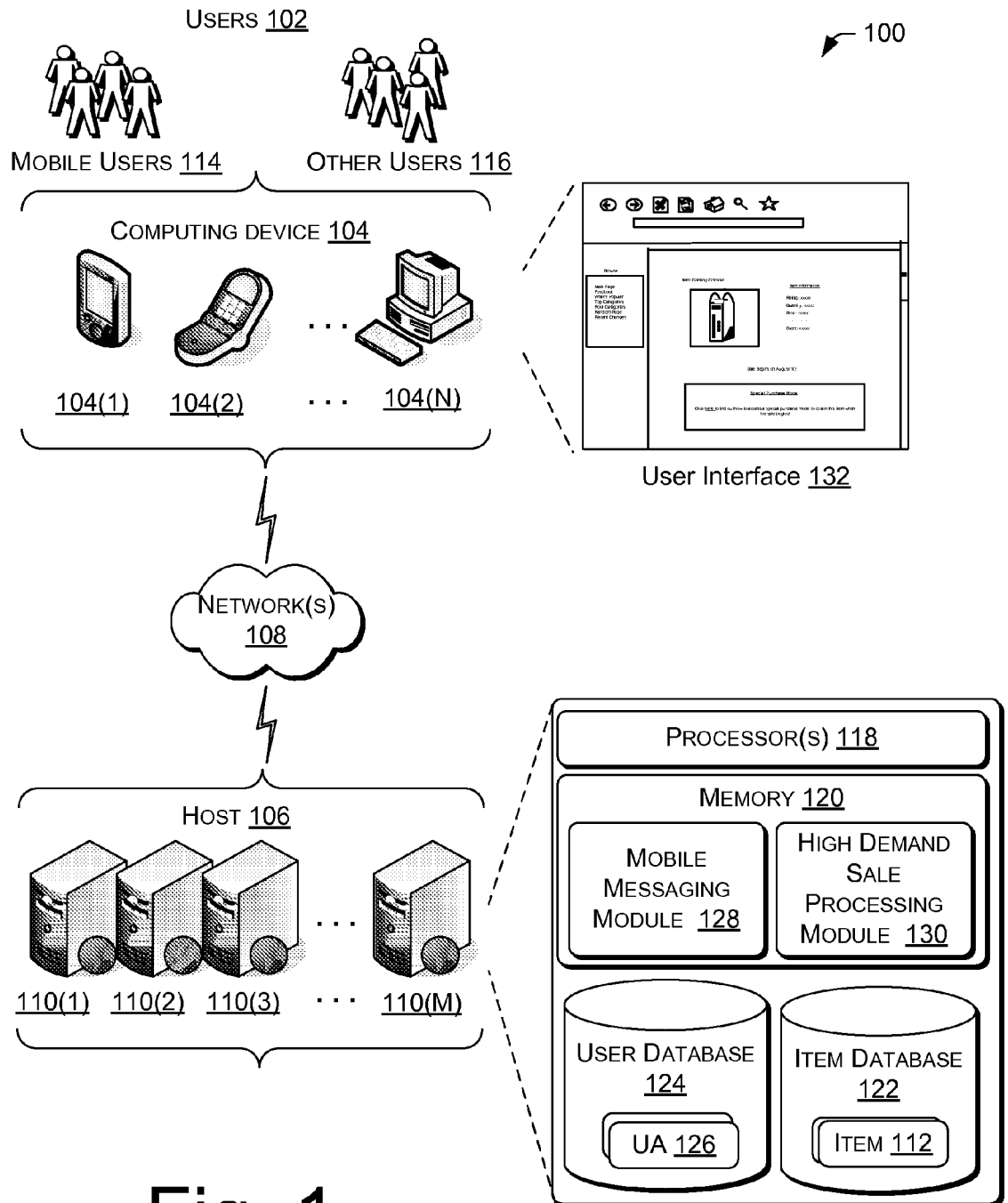
FIG. 1 shows an illustrative computing environment for providing high demand sale processing to a user via mobile device messaging.

FIG. 1 shows an illustrative computing environment 100 for providing high demand sale processing to a user via, at least in part, mobile device messaging. The computing environment 100 enables users 102 to purchase or otherwise obtain items from a merchant. The users 102 (e.g., customers) are associated with one or more client computing devices 104 that access the merchant via a host 106 using a network 108. The merchant may use the host 106 to facilitate offering items for consumption, conveying information, or otherwise interacting with the users 102 via the computing devices 104. The network 108 is representative of many different types of networks, such as cable networks, the Internet, local area networks, mobile telephone networks, wide area networks and wireless networks, or a combination of such networks.

The host 106 may include one or more servers 110(1), ..., 110(M) arranged in one or more available server configurations, perhaps as a server farm. The host 106 is capable of handling requests from many users and serving, in response, various information and data to the computing devices 104. The servers 110(1)-(M) may enable item hosting and payment processing and thus are capable of facilitating consumption of items 112 by the users 102 via the computing devices 104. In this manner, the host 106 is representative of essentially any site supporting user interaction, including online e-commerce sites, and so forth. As discussed herein, the items 112 may include products, services, sellable units, customer-created content (e.g., artwork), or anything else to which may be consumed by the users 102.

The computing devices 104 may include a mobile telephone 104(1), a portable digital assistant (PDA) 104(2), and a personal computer 104(N). Other example computing devices 104 may include a television set-top box, a game console, a portable gaming device, a digital video recorder, a portable computer, electronic book readers, and other electronic or entertainment devices. The computing devices 104 may include software to enable various types of communications with the host 106, such as text-messaging based software to transmit text messages via a mobile telephone network, among other possibilities.

The users 102 employ the computing device 104 to interact with the host 106 via various communication channels. For example, the users 102 may interact with the host 106 using a web interface to search for items, access information, or conduct transactions. In addition, mobile users 114 may interact with the host 106 via mobile telephone communications over a mobile telephone network. As such, the mobile users 114 have various methods at their disposal to communicate with the host 106, and to ultimately identify and purchase items offered for sale by the merchant. The mobile users 114 may be distinguished from other users 116, which do not have the user account 126. Although users 114 are described as mobile users for convenience, in some embodiments the users may be using devices to communicate with the host 106 that are not mobile.

In one possible scenario, the computing device 104 sends a request to the host 106. The request may be a uniform resource identifier (URI) request, a short message service (SMS) message, a multimedia messaging service (MMS) message, mobile instant messaging (MIM), e-mail, or other type of request. Upon receiving the request, the host 106 may return a user interface (or other page or communication) to a requesting computing device 104, allowing the user to interact with the data provided by the servers. For example, a returned user interface may include information that enable the user 102, via the computing device, to request to participate in a high demand sale. In addition or alternatively, the returned user interface may include information to enable the mobile users 114, for example via a computing device 104(1), to engage in transactions with the host 106.

Other user interfaces, such as dedicated mobile telephone applications may be stored locally on or remotely to the computing device 104, may be used to interact with the host 106. Further, the computing device 104 may use text-based commands, such as short message service (SMS) messages among other available mobile messaging applications to communicate with the host 106.

As illustrated in FIG. 1, the servers 110(1)-(M) are equipped with one or more processors 118 and memory 120. The memory 120 may include applications, modules, and/or data. The servers 110(1)-(M) also are in communication with an item database 122 that includes the items 112 and a user database 124 that includes user accounts 126. The item database 122 may store information about the items 112 offered for sale by the merchant via the host 106. Each of the items 112 represents an item record which may be made available or distributed to the users 102 by the host 106. The user database 124 may store information about the mobile users 114, where each of the mobile users 114 may have an associated one of the user accounts 126.

In accordance with various embodiments, the memory 120 may include a mobile messaging module 128, which may facilitate messaging between the computing devices 104 and the host 106. For example, the messaging may be SMS messages or MMS messages, among many other possibilities. The mobile messaging module 128 may create and maintain the user accounts 126 that may be established upon verification of an identity of the mobile users 114 who intend to interact with the mobile messaging module. In some embodiments, a prerequisite for creating one of the user accounts 126 includes associating a unique mobile phone number, or other identifier associated with the device, with the user account. Other identifiers could be, but are not limited to, a Media Access Control (MAC) address, Ethernet hardware address (EHA), among many other possibilities. The mobile messaging module 128 may enable the mobile users 114 that have the user accounts 126 to respond request from the host 106, make payments, authorize payments, and interact with a transaction account, among other possible actions related to the user account. The user accounts 126 may include a payment method (e.g., credit card information, bank account information, etc.) and shipping information, among other possible user information.

In some embodiments, the memory 120 may include a high demand sale processing module 130. The high demand sale processing module 130 may enable the merchant to offer a portion of the items 112 for sale to the mobile users 114 via the mobile messaging module 128. The high demand sale processing module 130 may also verify the mobile user's eligibility to participate in a sale, such as by accessing the user accounts 126 or conducting other verifications, ensuring item purchase limits have not been reached or exceeded, and that the mobile user has complied with any other applicable rules.

In accordance with one or more embodiments, a computing device, such as the computing device 104(N), may be equipped with a user interface (UI) 132 to provide access to the user account 126 and/or the items 112 via the host 106. For example, the users 102 may communicate with the host 106 via the user interface 132 on the computing device 104 (e.g., the personal computer 104(N)) to interact with the user accounts 126 and/or the items 112.

Figure 2:
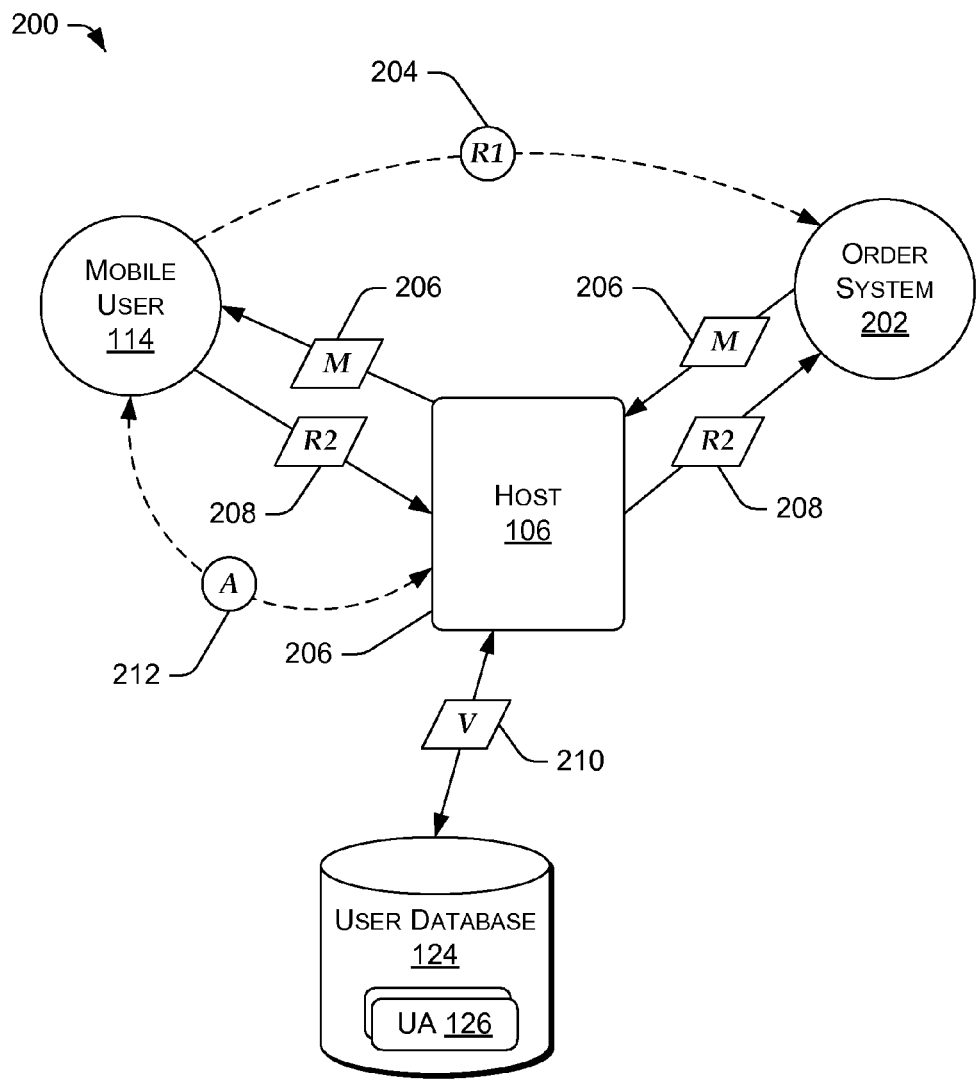
FIG. 2 shows an illustrative schematic of a mobile messaging system including messaging between a user and a merchant via a host in accordance with some embodiments of the disclosure.

FIG. 2 shows an illustrative architecture 200 of a mobile messaging system including messaging between the mobile user 114 and a merchant via the host 106, which may be used in a high demand sale. The host 106 may relay messaging between the mobile user 114 and an order system 202, which may ultimately enable the mobile user to obtain an item offered in a high demand sale. The order system 202 may conduct the high demand sale, which may include items that experience fast inventory depletion (i.e., very short availability) when made available for sale, sometimes measured in seconds or minutes of time rather than hours or days of availability (e.g., available for less than 30 minutes, etc.). The architecture 200 may enable the mobile users 114 to participate in the high demand sale while providing the mobile users a fair opportunity to participate in the sale (and in some embodiments, special advantages over other users 116), as discussed below.

As an initial matter, the users 102 may register with the host 106 to obtain the user account 126 and thus become one of the mobile users 114. According to one embodiment, the users 102 may establish the user account 126 by providing requested personal information (e.g., shipping and billing information) and the user's mobile telephone number, or other device identifier, some of which may be verified during additional processing. As such, according to some embodiments, each user account is limited to one mobile telephone number, although in other embodiments multiple identifiers may be associated with the account. Regardless, some limit is advantageous to drastically limit the ease or ability for mass creation of the user accounts 126. In contrast, conventional e-commerce environments only require a valid e-mail account which is relatively easy to obtain, even in large quantities. A reseller may obtain additional email addresses at no cost, but acquisition of additional mobile telephones, or other unique device identifiers, can be cost prohibitive. Thus, by having the mobile users 114 associate a mobile telephone number for each of the user accounts 126, and by limiting each of the user accounts to a single unique mobile telephone number, the architecture 200 may make it difficult for resellers to spoof the host 106 using bots or other known methods to falsely represent oneself and make additional purchases of items by circumventing item quantity limits implemented by the host.

In accordance with various embodiments, the mobile user may send a first request 204, designated as R1, to the order system 202 to sign up (e.g., request a notification) to participate in a high demand sale. For example, the merchant, via the order system 202 and/or the host 106, may announce the future sale of an item in which the merchant expects to experience relatively quick exhaustion of inventory. The merchant may enable the mobile users 114 to sign up to participate in a high demand sale by various methods. In some embodiments, the merchant may provide a sign up form on the merchants' website, provide a subscription email address, operate a telephone call center, receive mobile text communications, or provide other options to enable the users sign up. In addition, the merchant may communicate rules and eligibility for the high demand sale via one of the above processes.

According to some embodiments, for example, the merchant may message to the customer that "This item is out of stock, please enter your mobile telephone number in the provided form to be notified when this item is back in stock." In some embodiments, if the telephone number is already associated with the user's account, the user may only need to select a button on the webpage.

In accordance with various embodiments, the merchant may communicate to the mobile user 114 to expect a message 206 (e.g., host message) prior to the start of the high demand sale. Upon receipt of that message 206, the mobile user 114 may have a predetermined amount of time to opt-in to participate in the sale. However, the mobile user 114 may not be guaranteed to receive an item if he/she opts-in, but will at least participate in the sale as explained below. The message 206 may include information about the high demand sale. For example, the message may identify an expiration of the message or time limit for the mobile user to respond (opt-in) to the message 206. Other information may also be included in the message 206 such as a quantity limit, item information, or other sale information.

After receipt of the message 206, the mobile user may respond to the message via a second request 208 in accordance with the rules (if applicable) in order to qualify to participate in the high demand sale. The second request may be a text-based message or other type of message (oral, pictorial, etc.) from the mobile user 114 (e.g., a mobile request) that may include account information of the mobile user. In this way, the merchant, via the order system 202, may verify the identity of the mobile user. However, since the merchant already can identify the device based on its unique identifier (e.g., phone number, etc.), in some embodiments, the user need only reply to the message 206 with an indication that the user would like to participate in the sale. The second request may initiate a verification 210 of the mobile user's eligibility by accessing the mobile user's user account 126 from the user database 124. The verification may perform one or more checks to verify whether the mobile user is eligible to participate in the high demand sale. For example, the verification 210 may determine if the mobile user has a valid instance of the user account 126. In addition, the verification 210 may determine whether the mobile user 114 has reached a quantity limit for the item in the high demand sale and thus is no longer eligible (e.g., already purchased the item in a prior sale when the message 206 includes a one item limit for each user, etc.). In some embodiments, the verification 210 could also verify that the user has one or more of a preferred payment method, shipping address, or shipping expediency option selected for use in completing the transaction.

If the verification 210 confirms the user is eligible, the order system 202 may process the second request in accordance to a fulfillment process of the high demand sale, which is described below. In some embodiments, the host 106 may pass the second request and any data obtained in the verification process to the order system 202, which in turn may perform the verification to determine whether the mobile user 114 is eligible to participate in the high demand sale.

In accordance with one or more embodiments, the second request may include a mobile payment, such as money, credits, a payment account number, elements, etc. to the order system 202 via the host. In this way, the mobile user 114 may initiate a transaction, which may be completed if the order system 202 obtains an item for the mobile user 114. Alternatively, if the order system is unable to obtain the item for the mobile user, the transaction may be voided or otherwise discontinued. In some embodiments, the user account 126 may be a transaction authorization service account as disclosed in U.S. patent application Ser. No. 11/546,534 entitled "Transaction Authorization Service" filed on Oct. 10, 2006.

In accordance with some embodiments, the mobile user 114 may transmit the second request 208, which includes payment information, to the host 106. The second request 208 may originate from a web-interface communication, an email, a telephone service, an SMS message, an MMS message, an MIM message, customized mobile application message, or another communication which associates the mobile user 114 to the user account 126, thus enabling the verification 210. For example, SMS commands may be established to enable the mobile user 114 to transact with the order system 202 via the host 106. The mobile user 114 may send an SMS "Buy Item1234 Acme" to the host 106 for processing, where "Item1234" is the item 112 the mobile user 114 desires to purchase and "Acme" identifies the merchant, via the order system 202. This may be an established command and/or be provided to the mobile user in the message 206.

In some embodiments, the host 106 may transmit an authorization request 212 to the mobile user 114. For example, when the second request 208 is initiated using an unsecure communication, such as an SMS text message, the second request 208 may be verified by the authorization request 212. The authorization request 212 may be communicated to the mobile user 114 by any type of communication, such as, without limitation, a voice automated message, an email, an SMS message, or any other type of communication. The mobile user 114 may respond to the authorization request 212 by selecting a command to indicate an approval of the second request 208. For example, in a mobile telephone communication, an interactive automated voice system may enable the mobile user 114 to accept or deny the second request 208 during the authorization request 212. In addition to authorizing the request, the mobile user 114 may also be prompted or required to enter other information to complete the authorization, such as a personal identification number (PIN) or password, which may provide additional security and/or verify the identity of the mobile user.

As described herein, the architecture 200 may be implemented to prevent bots from spoofing the order system 202 and make multiple purchase requests (the second request 208) on behalf of a reseller. It may be difficult or cost prohibitive to create bots that can obtain the user accounts 126 stored in the user database 124. In addition, it may be difficult and cost prohibitive to have bots perform operations using mobile telephony because, unlike the Internet and spoofing URL (uniform resource locators), etc., mobile telephony uses different protocols and commands which may not enable use of Internet spoofing schemes which have been successful in the past.

Illustrative Operation

Figure 3:
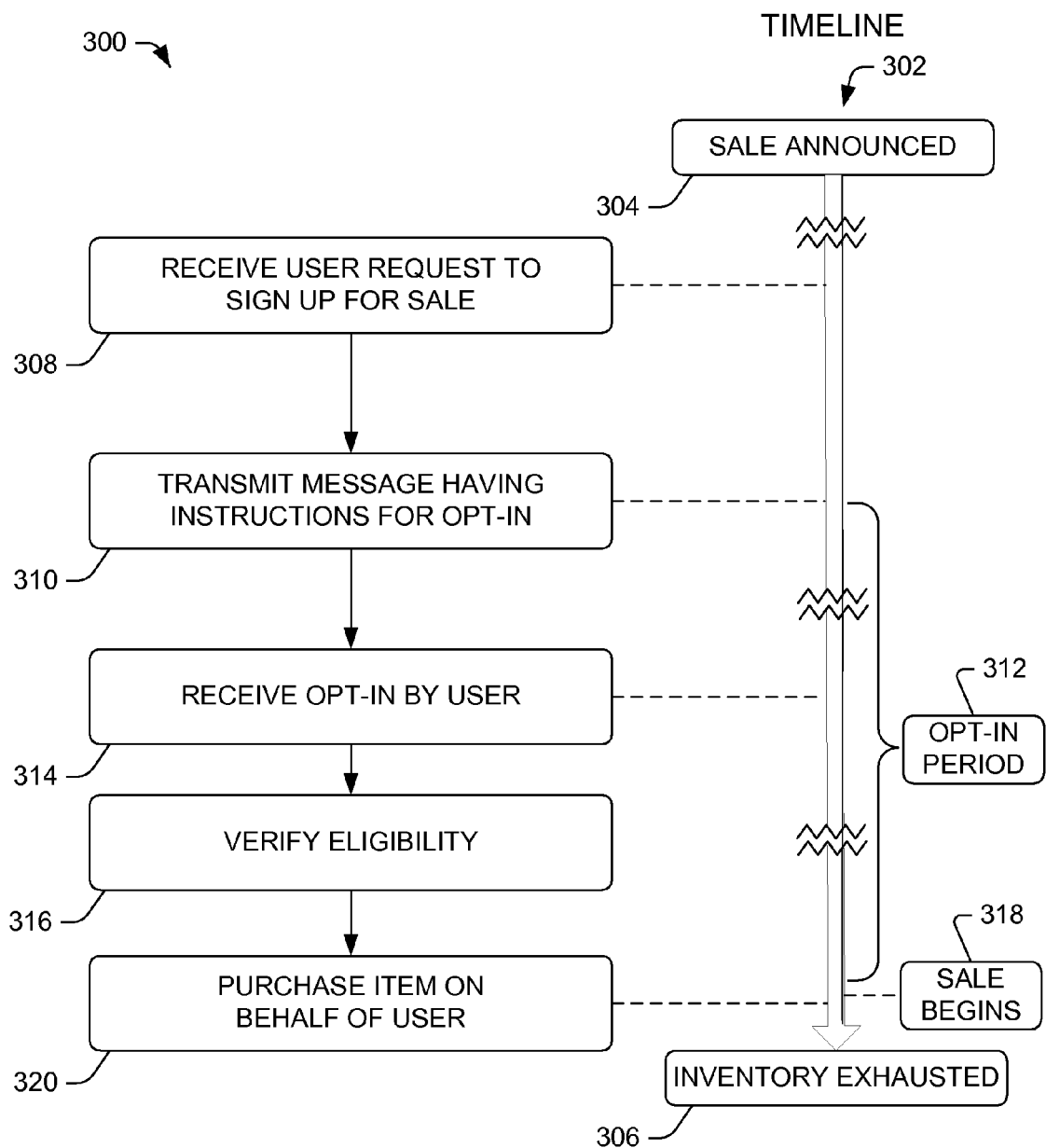
FIG. 3 shows an illustrative flow diagram of a process to allow a user to opt-in to a high demand sale process using mobile device messaging in accordance with some embodiments of the disclosure.

FIG. 3 shows an illustrative flow diagram of a process 300 to enable a user to opt-in to a high demand sale process using mobile device messaging. The process 300 includes a time timeline 302 to provide a time reference of the operations described with reference to the process 300. The timeline 302 spans from a first point in time when a high demand sale of the item 112 is announced at 304 to a second point in time when an inventory of the item is exhausted at 306. In other embodiments, the blocks could be rearranged in other sequences and still remain within the spirit and scope of the disclosure.

At 308, the merchant, via the host 106, may receive the mobile user 114 request to sign up for a high demand sale process, which coincides with the first request 204 in FIG. 2. The request occurs after a sale is announced at 304 to enable the user to learn about the sale. For example, the merchant may promote the sale at the first point in time when the sale is announced at 304 by way of advertising, providing a message on the merchant's website, transmitting e-mails directed to potential customers, etc. In some embodiments, the sign up operations 308 may occur more or fewer times than the number of high demand sales, thus enabling the mobile user 114 to potentially avoid signing up for each high demand sale that he/she desires to participate in.

At 310, the merchant, via the host 106, may transmit a message to the mobile user 114, via the computing device 104, who signed up at 308. The message may include information about the sale including an opt-in period 312, quantity restrictions, information about a selection process of winning participates (as discussed below), among other possible information. The opt-in period 312 may be set for any length of time, such as 10 minutes, 30 minutes, 24 hours, etc. The message may also inform the mobile user 114 how to successfully reply to the message, such as by sending a SMS message to the host 106 including the item number or other requested information.

At 314, the host may receive an opt-in request from the mobile user 114 that indicates the mobile user would like to participate in the high demand sale. The host may then verify the eligibility of the mobile user at 316. For example, the host 106 may verify the user has not reached or exceeded any quantity limits included in the high demand sale, such as by participating in a previous sale of the item 112. In addition, the host 106 may verify the user account 126 of the mobile user 114 is valid. The validation operation, among other operations in the process 300, may prevent bots from spoofing the host 106 and making multiple purchases of the item 112 on behalf of the reseller.

At 318, the high demand sale may begin. In some embodiments, both the mobile users 114 that opted-in during the opt-in period 312 and were deemed eligible, and the other users 116 that may attempt to purchase the items 112 using conventional methods (e.g., via an e-commerce website) may concurrently compete to purchase the items 112 in a high demand sale. In this situation, the host 106 may try to purchase the items 112 on behalf of the mobile users 114 that opted-in during the opt-in period 312 and were deemed eligible.

In some embodiments, the host 106 may employ host bots at 320 to purchase the item 112 on behalf of the mobile user 114. The host bots may be configured to make purchases at a predetermined rate that minimizes or avoids disruption to an order system. For example, the host bots may not make all possible purchases at one moment in time, but instead they may spread the purchases request over a period of time. The host bots may bypass user interface layers, such as webpage layers that customers must navigate through to purchase the items.

For example, twenty of the items 112 may be offered for sale in the high demand sale. At 314, the host 106 may receive thirty-five requests from different mobile users to participate in the high demand sale, where each participant is limited to one of the items 112. When the high demand sale begins at 318, the host bots initiated by the host 106 may attempt to purchase thirty-five items (or, in some instances, less than thirty-five items). However, because of limitations in inventory and because some of the items 112 are consumed by the other users 116, the host bots may be unsuccessful in fulfilling the purchase requests for all the mobile users. At 306, when the inventory is exhausted, the host bots may have purchased a portion of the initial inventory (i.e., twenty items in inventory in this example) while the other portion of the inventory may be purchased by the other users 116. In this way, both the mobile users 114 and the other users 116 may be able to compete to obtain the item 112.

The mobile users may enjoy benefits of the high demand sale such as the opt-in period 312 to decide whether to participate in the sale. In contrast, the other users 116 may only have a short period between when the sale begins 318 and the inventory is exhausted at 306, thus requiring them to actively participate during a definite time period that is often very short in a high demand sale. This may be disruptive to the other users 116 because it does not provide flexibility when the other users 116 participate in the sale. For example, if the sale begins when the users are at work, some of the other users 116 may not be able to participate while the mobile users 114 may opt-in prior to beginning work and still participate even when the sale begins while they are at work because mobile users do not have to take action once the sale begins 318. Thus, the user experience of the mobile users 114 may be improved because the mobile users do not need to rush to the website at the exact moment of the sale.

In other embodiments, the high demand sale may be exclusively offered to the mobile users 114 via the process 300, which may exclude the other users 116 from participating in the sale. In additional embodiments, a portion (less than all) of the items in the high demand sale may be reserved for consumption by the mobile users 114. Regardless of whether the other users 116 are allowed to participate in the high demand sale, the process 300 limits the ability for resellers to use bots to purchase the items 112 during the high demand sale, thus improving fulfillment of the items 112 to the users 102 in accordance with applicable quantity restrictions. This may in turn boost user loyalty to the merchant and/or result in other goodwill toward the merchant.

Figure 4:
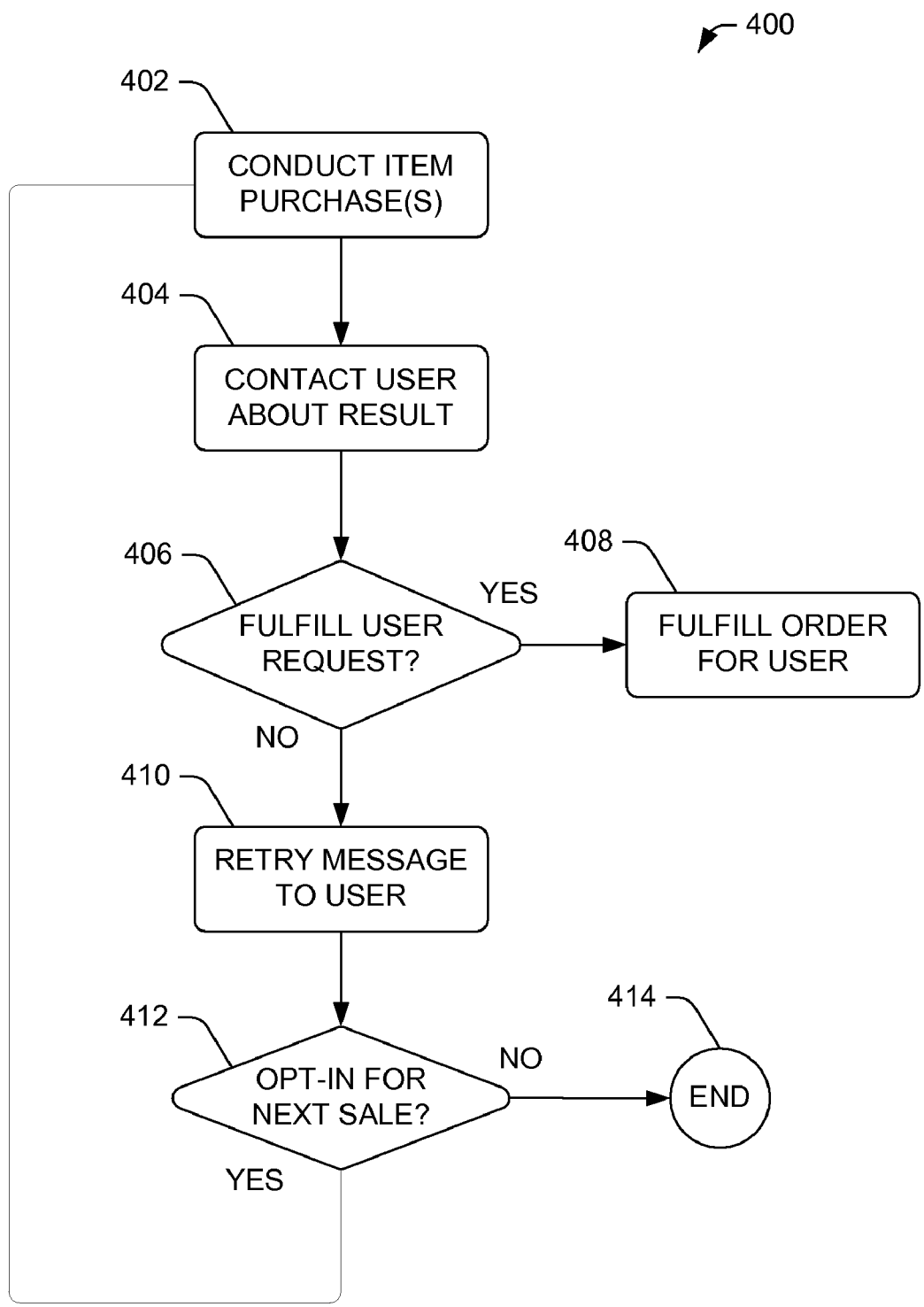
FIG. 4 shows an illustrative flow diagram of a process of fulfilling a high demand sale request in accordance with various embodiments of the disclosure.

FIG. 4 shows an illustrative flow diagram of a process 400 of fulfilling a high demand sale request in accordance with various embodiments of the disclosure. The process 400 may occur after the item 112 is purchased on behalf of the mobile user 114 as shown in the operation 320 in FIG. 3. Thus, at 402, the item(s) are purchased on behalf of one or more of the mobile users 114.

At 404, the mobile users 114 may be contacted by the merchant (e.g., via the host 106, the order system 202, etc.) to inform the mobile users whether an item was purchased on their behalf during the high demand sale. For example, the merchant may send an SMS text message to the mobile user 114, via the host 106 to inform the mobile user of the results of the sale. Other communication methods, such as email, an automated calling system, and so forth may also be used to contact the mobile user at 404.

At the operation 404, the host 106 may use a variety of approaches to determine which of the mobile users 114 receive purchased goods when more mobile users exist than items obtained for the mobile users. For example, the items may be assigned to the mobile users 114 (which are deemed eligible) using a lottery or random assignment. If the sale allows purchase of multiple items per mobile user, then sales may be completed in whole (all items fulfilled for the mobile user) or each item request may be processed separately (e.g., the mobile user may only get one of two requested items).

The host 106 may also use customer history to assign the purchased items to the mobile users. For example, a high valued user having more transactions with the merchant may receive priority over a new customer, or vice versa, to enable the merchant to improve user loyalty or other metrics important to the merchant. Still further methods of assigning or distributing purchased items to the mobile users may be employed, such as a first come, first served method which provides the items to mobile users that were first to complete some predetermined event, such as opt-in to receive the message, which the host receives at the operation 308, although other events may be used. In yet another example, when a customer opts-in at the operation 412 for a second chance, the user may receive a priority in item fulfillment at 404.

At 406, the host 106 determines whether the order system 202 must fulfill the user request. As discussed above, the order system 202 may initiate a transaction when the mobile user opts-in to participate in the high demand sale. Thus, the mobile user 114 may have a payment request pending, which may be completed at 408 if the mobile user has his/her order fulfilled by the order system 202 (i.e., the host bot was able to purchase the item on behalf of the mobile user). Alternatively, the order system 202 may be unable to fulfill the order request and may cancel the payment transaction involving the mobile user. In this way, the order system 202 may ensure that the mobile users 114 have sufficient payment funds when an item purchased on their behalf.

At 410, the host 106 may send a retry message to the mobile user 114 if the order system 202 is unable to fulfill the purchase request for the mobile user. The retry message may enable the mobile user to opt-in to a future offering of the item 112. For example, another high demand sale involving the item 112 may occur in the future when the merchant receives a next shipment of the item. The user may sign up at 410 and thus affectively complete the operation 308 as described in FIG. 3. If the mobile does not sign up at 412, the process 400 may end at 414. In some embodiments, the operation 412 may prompt messaging to inform the mobile user 114 of the next high demand sale of the item, but not require the user to sign up to complete the operation 308.

Illustrative Interfaces

Figure 5:
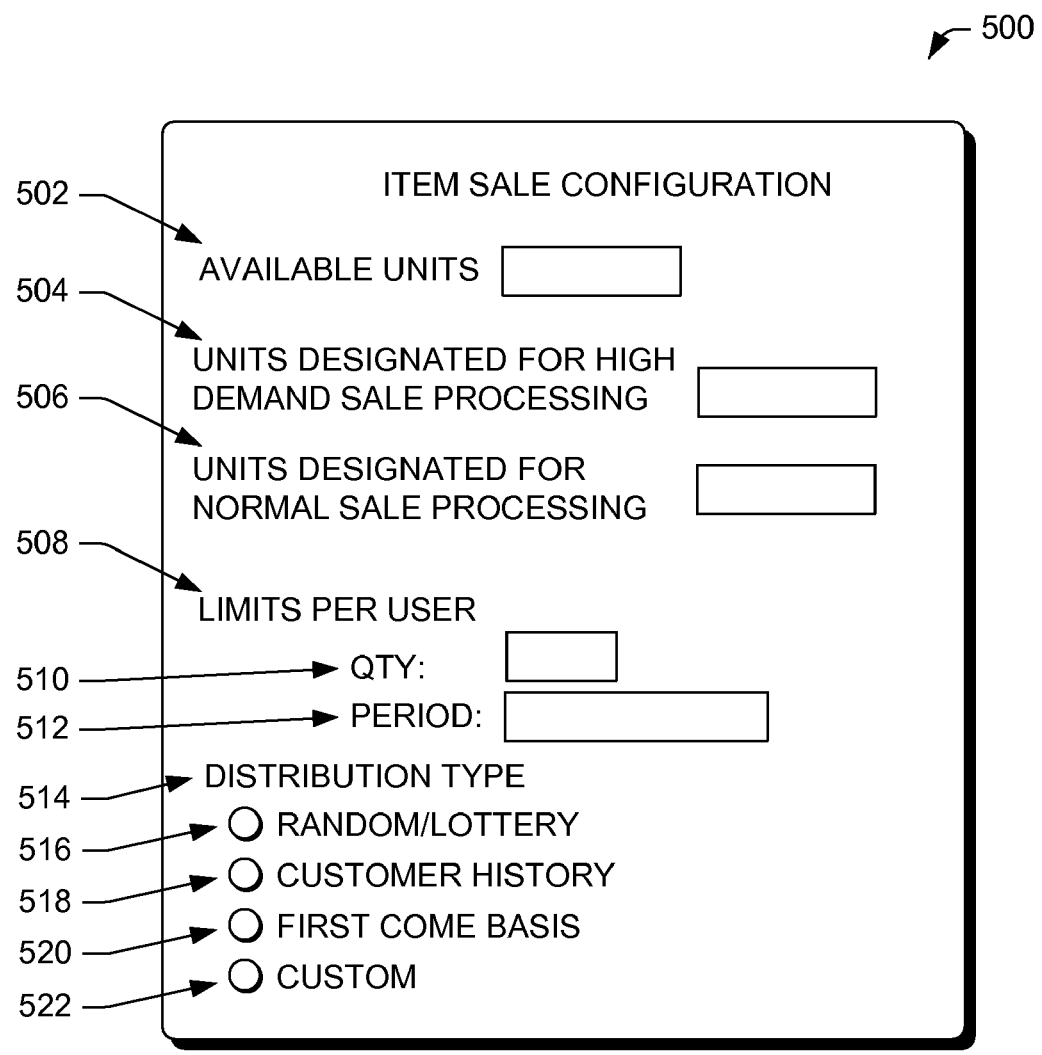
FIG. 5 shows an illustrative interface to configure items for sale in a high demand sale in accordance with some embodiments of the disclosure.

FIG. 5 shows an illustrative interface 500 that may be used configure items for sale in a high demand sale in accordance with some embodiments of the disclosure. The interface 500 may enable an analyst or other employee of the merchant that is responsible for defining operating rules for a high demand sale. The host 106 may use the information entered in the interface to determine how to allocate the sale of items of the high demand sale.

The interface 500 may include available units 502 that are a quantity of units available for sale (i.e., the item inventory). The available units 502 may be divided into one or more categories that may correlate to the type of the users 102 that are eligible to participate in a sale of the items. Units designated for high demand sale processing ("HDS field)" 504 may be the units which are reserved for consumption by the mobile users 114. Thus, the quantity in the HDS field may ensure that the mobile users 114 actually receive items (i.e., items fulfillment occurs for these users) if the HDS field includes a quantity greater than zero. Units designated for normal sale processing ("NS field") 506 includes units that are not restricted to consumption by the mobile users 114, but may also be purchases using the process 300 by the mobile users 114 and also via conventional transaction processes by the other users 116 (e.g., purchased from a web interface on the merchants website). The values of the HDS field 504 and the NS field 506 should equal the available units 502.

In some instances, the HDS field 504 may have a quantity equal to the quantity of available units 502. This situation may result in an exclusive sale for the mobile users 114. The exclusive sale may only enable the mobile users 114 to purchase the items 112 using the process 300 while the items would not be available for consumption by the other users 116. However, if the HDS field has a quantity of zero, the mobile users may still participate in the sale, but may not receive any preferential treatments, such as having a quantity of items designated for consumption by the mobile users.

Limits 508 may be applied to the item in the sales to restrict the purchases of the users 102. In some embodiments, the limits 508 may include a quantity limit 510 and/or a period limit 512. The quantity limit may limit the number of items the user 102 may purchase in a transaction, during a period, or for the existence of a user account. The period limit 512 may limit the number of items the user may purchase for a period of time. As shown, the quantity limit 510 and the period limit 512 may be used in combination to restrict the number of items the user 102 can purchase. In some instances, the period limit 512 may be a single session involving the high demand sale.

In various embodiments, the items 112 may be coded in such a way to designate the item as being restricted to consumption by the mobile user 114 (via the box 1 504) or by the other users 116 or the mobile users 114 (via the box 2 506). For example, the item may include an identifier (e.g., a unique product identifier number, etc.) that indicates how the item may be consumed during a sale.

The interface 500 may also include a distribution type designator 514, which may be used to determine how the items that are purchased on behalf of the mobile users 114 are allocated to the mobile users when there are fewer purchased items than mobile users. The distribution type designator 514 may thus determine the outcome at the operation 504 as described in process 400 with reference to FIG. 4. The distribution type designators 514 may include, without limitation: a random/lottery option 516, a customer history option 518, a first come basis option 520, or a custom option 522. The random/lottery option 516 may distribute the items using user account numbers or other random and/or lottery style distribution techniques. The customer history option 518 may reward customers that have active accounts with the merchant, or conversely encourage new users to participate by increasing their success rates. The first come basis option 520 may provide a distribution advantage based on the first mobile users to complete a predefined task, such as opting-in to participate in the high demand sale. Finally, the custom option 522 may enable the merchant to create other types of distribution types.

Figure 6:
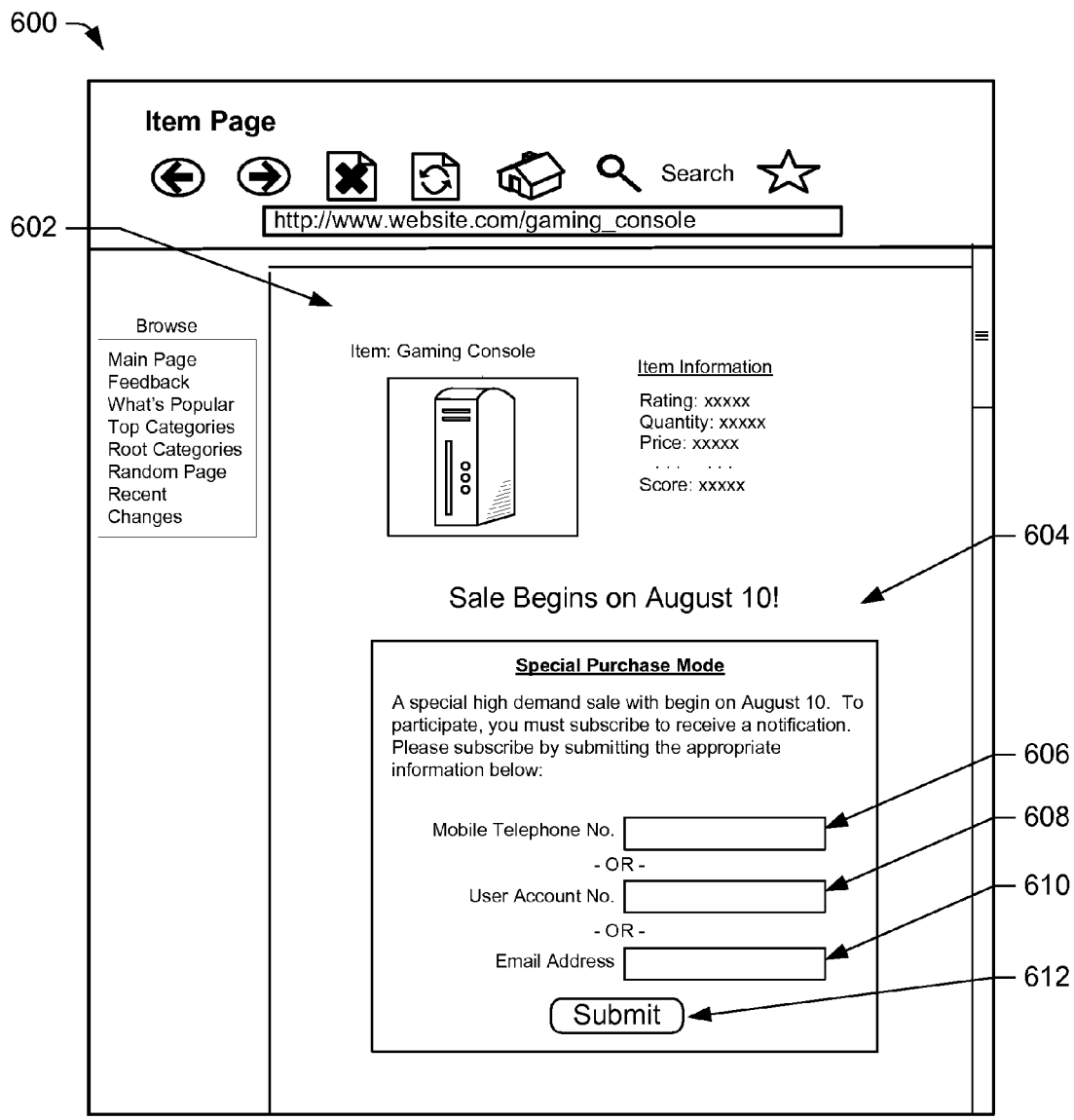
FIG. 6 shows an illustrative page to enable a user to sign up to receive messaging of a future high demand sale process in accordance with one or more embodiments of the disclosure.

FIG. 6 shows an illustrative page 600 to enable a user to sign up to receive messaging of a future high demand sale process in accordance with one or more embodiments of the disclosure. The page 600 may include information about the item in an item detail section 602. The item detail section 602 may include information about the item, the price, or other information related to the item. A sale announcement section 604 may indicate when the item goes on sale. In addition, the sale announcement section 604 may include information to enable the mobile user 114 to sign up to participate in a high demand sale. For example, the sale announcement section 604 may enable the mobile user 114 to enter one or more pieces of user information (e.g., a mobile telephone number 606, a user account number 608, an email address 610, etc.) via a web interface to identify the customer. The user information may be transmitted to the host 106 upon selection of a submit button 612, such as shown in the operation 308 in FIG. 3. The announcement section 604 may present other options to the mobile user 114 to enable the sign up, such as by sending a SMS message as the request, sending an e-mail as the request, and so forth.

Illustrative System Components

Figure 7:
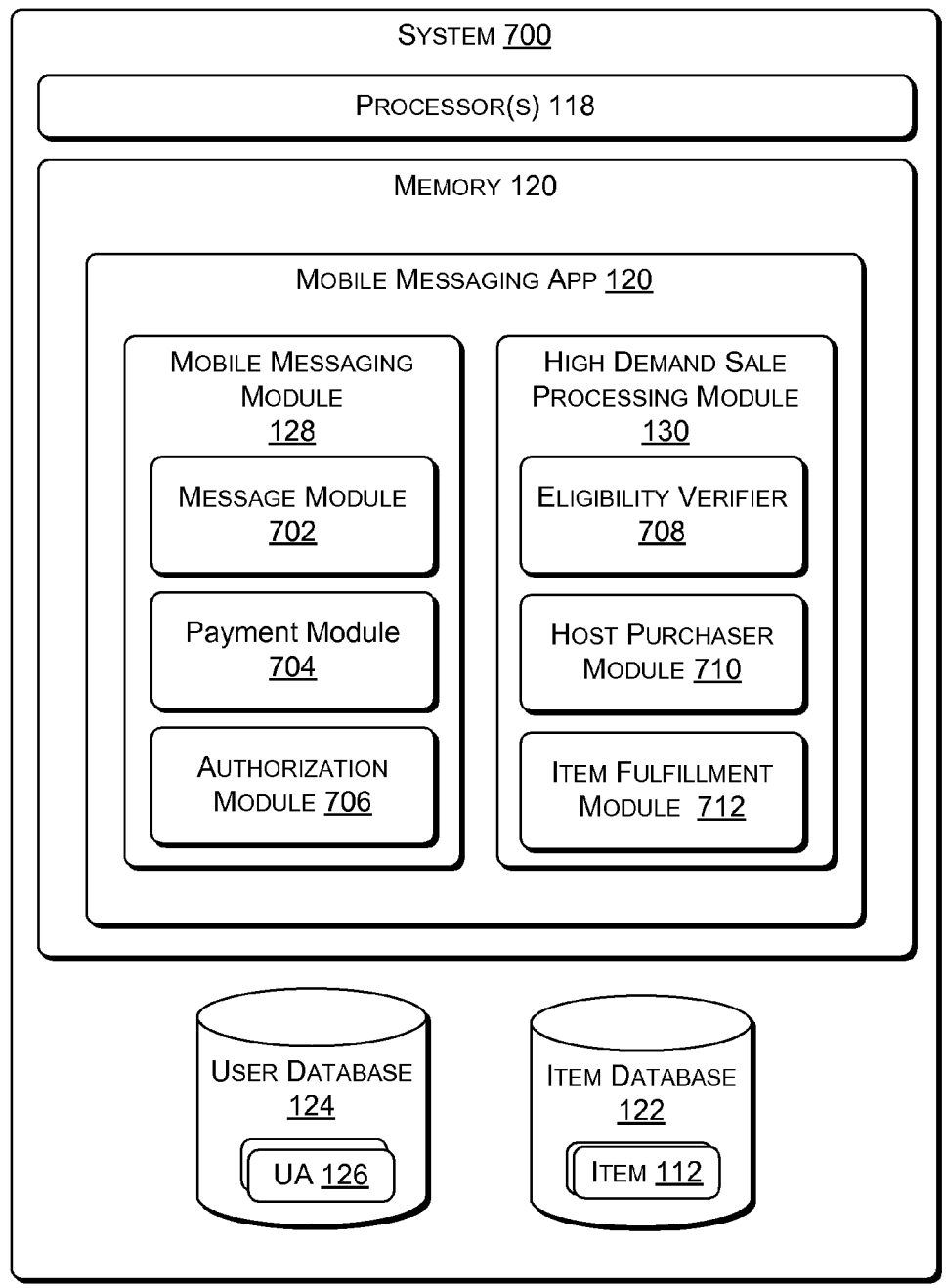
FIG. 7 shows a computing system illustrating one or more embodiments of components associated with the computing environment of FIG. 1.

FIG. 7 shows an illustrative computing system 700 illustrating one or more embodiments of components associated with the computing environment of FIG. 1. The mobile messaging module 128 may include a message module 702, a payment module 704, and an authorization module 706, among other possible components.

The message module 702 may facilitate messaging with the mobile user 114. For example, the message module 702 may communicate with the mobile user 114 via a SMS message, an MMS (multimedia messaging service) message, a customized mobile telephone application for communicating with the merchant via the host 106, etc. The message module 702 may enable the mobile user 114 to sign up for the high demand sale (e.g., the operation 308), transmit an opt-in request to the mobile user (e.g., the operation 310), opt-in in response to a message about an upcoming sale (e.g., the operation 314), or facilitate other communications between the mobile user 114 and the host 106.

The payment module 704 may enable the mobile user 114 to initiate a payment for an item included in a high demand sale. For example, the payment module 704 may allocate funds from the mobile user 114 to the host 106 via a transaction with the order system 202. In accordance with some embodiments, the transaction may not be completed until the mobile user 114 receives the item (i.e., the purchase request is fulfilled).

The authorization module 706 may operate in conjunction with the payment module 704 to ensure the mobile user 114 is authorized to transmit a payment via the payment module. For example, when the mobile user 114 requests a payment using an unsecure transmission such as SMS, the authorization module 706 may send an authorization request to the mobile user to verify an intention to transmit a payment.

In accordance with one or more embodiments, the high demand sale processing module 130 may include an eligibility verifier 708, a host purchaser module 710, and an item fulfillment module 712, among other possible components.

The eligibility verifier 708 may be used to verify if the mobile user 114 has met any applicable requirements to be eligible for the high demand sale. For example, the eligibility verifier 708 may determine whether the mobile user 114 has one of the user accounts 126 stored in the user database 124, has sufficient funds to purchase the items, has not reached or exceeded quantity limits or other purchase restrictions, and/or has complied with other rules of the high demand sale. The rules of the sale may be communicated to the mobile user via the message module 702.

The host purchaser module 710 purchases the items 112 on behalf of the mobile user 114 one the high demand sale begins. For example, the host purchaser module may employ the host bots that may compete with the other users 116 that attempt to purchase the item on an e-commerce website operated by the merchant, via the host 106.

The item fulfillment module 712 may perform one or more of the operations described with reference to FIG. 4 and the process 400. For example, the item fulfillment module 712 may distribute or associate any purchased items to the mobile users 114 via one or more methods, such as by customer purchase history, a lottery or random process, a first come and first serve process, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method, comprising:
    under control of one or more computer systems configured with executable instructions,
        designating items as being available for purchase via a sale process that includes an opt-in sale process for registered users and a default sale process for non-registered users, at least a portion of the default sale process being performed concurrent with the opt-in sale process to enable non-registered users that do not qualify for the opt-in sale process to acquire at least a portion of the items via the default sale process;

registering users for the opt-in sale process by:

receiving from a wireless device a request to purchase an item from a seller or a host in an impending offer for sale;

associating the request with a user having a user account;

verifying that the user is eligible to purchase the item in the impending offer for sale based at least in part on the user account;

initiating the offer for sale of the items by making the items available for purchase by the registered users in the opt-in sale process and by the non-registered users in the default sale process;

assigning a predetermined throttle rate to bots to control a purchase rate of the bots, wherein the bots are configured to attempt to purchase the item on behalf of the registered users that are eligible to purchase the item; and attempting to purchase the item on behalf of the registered users in the opt-in sale process after the offer for sale begins at a time after the registered users are verified to be eligible to purchase the item, wherein the attempting to purchase the item is performed by using the bots to attempt to purchase the item on behalf of the registered users that are eligible to purchase the item, the bots to compete concurrently against non-registered users that attempt to purchase the item in the default sale process without using the bots.

2. The method as recited in claim 1, further comprising assigning at least one purchased item from the opt-in sale process to at least one of the registered users when the item is successfully purchased based at least in part on an algorithm to provide a random distribution of items to the registered users that is independent from a chronological receipt of the request.

3. The method as recited in claim 1, wherein the registering users for the opt-in sale process further comprises transmitting host messages to the users to enable the users to opt-in to the impending offer for sale via the request, the host messages including a time period for the users to submit the request.

4. The method as recited in claim 1, wherein the request includes a mobile payment to initiate a transaction for a purchase of the item.

5. The method as recited in claim 1, wherein the request is communicated via at least one of a simple message service (SMS) message, a multimedia message service (MMS) message, or a mobile instant messaging (MIM) message.

6. The method as recited in claim 1, further comprising determining a purchase quantity restriction that specifies a maximum quantity of the item that a single user is allowed to purchase, and wherein the verifying that the user is eligible includes verifying that the user has a valid user account associated with a mobile telephone number and that the user has not reached the purchase quantity restriction for the item.

7. The method as recited in claim 1, wherein the bots engage in the attempting to purchase the item while competing against another bot and against the non-registered users that attempt to purchase the item via the default sale process.

8. The method as recited in claim 7, wherein the predetermined throttle rate includes a delay period before a subsequent purchase is executed, and throttling the bots to process purchases at the predetermined rate.

9. The method as recited in claim 1, wherein the bots are assigned to the users in a one-to-one relationship such that each user has an associated bot that acts to make a purchase on behalf of the user.

10. One or more computer-readable storage media storing computer-executable instructions that, when executed on one or more processors, performs acts comprising:

transmitting a message to a mobile device associated with a user prior to offering for sale a quantity of an item in a sale, the message including instructions for the user to participate in the sale;

receiving from the mobile device a response indicating that the user opts-in to participate in the sale;

determining that the opted-in user is eligible to participate in the sale;

assigning a predetermined throttle rate to bots to control a purchase rate of the bots that purchase the item during the sale on behalf of the opted-in and eligible user; and conducting the sale that includes the quantity of the item for sale for purchase by the opted-in and eligible user using the bots and by other users without using the bots, the bots attempting to purchase the item on behalf of the opted-in and eligible user using the predetermined throttle rate, the bots to compete concurrently against the other users that attempt to purchase the item without using the bots.

11. The one or more computer-readable storage media as recited in claim 10, wherein a user account is associated with the mobile device and the user, and wherein the user account is used to enforce a purchase limit of a purchase quantity restriction for the user.

12. The one or more computer-readable storage media as recited in claim 11, wherein the user account includes an associated payment method and shipping address that are used when the item is purchased on behalf of the user.

13. The one or more computer-readable storage media as recited in claim 11, wherein the user is eligible to participate in the sale based at least in part on the user account indicating that the user has not reached the purchase quantity restriction.

14. The one or more computer-readable storage media as recited in claim 10, wherein the user is eligible to participate in the sale based at least in part on the response being received prior to a specified deadline.

15. A system, comprising:

one or more processors; and memory, accessible by the one or more processors;

a sale processing module stored in the memory and executable on the one or more processors to enable mobile users having a valid user account unique to a mobile telephone number to obtain an item from available items via a mobile telephone communication with a host;

a media messaging module stored in the memory and executable on the one or more processors to facilitate the mobile telephone communication by transmitting a message to the mobile users and receiving respective responses by the mobile users to opt-in to a sale;

a default sale processing module stored in the memory and executable on the one or more processors to enable non-registered users to attempt to purchase at least a subset of the available items; and an item fulfillment module stored in the memory and executable on the one or more processors to allocate items purchased on behalf of the mobile users when fewer items are purchased than a number of items requested from the mobile users that opt-in to the sale, wherein the item fulfillment module purchases items on behalf of the mobile users by using bots that are at least partially controlled by the host or by a seller of the items, the bots having associated therewith a predetermined throttle rate that controls a purchase rate of the bots.

16. The system as recited in claim 15, wherein the sale processing module includes an eligibility verifier to determine whether the mobile users have a valid user account and have complied with rules of the sale, and further to disqualify ones of the mobile users from participating in the sale when the respective ones of the mobile users are not deemed eligible.

17. The system as recited in claim 15, wherein at least one of the bots engages in a purchase of the item while competing against another bot or against users that attempt to purchase the item via a web-interface.

18. The system as recited in claim 15, wherein the bats are used to purchase a predefined number of items, the predefined number of items to be determined by the host or by the seller of the items.

* * * * *